Patented July 5, 1932

1,865,978

UNITED STATES PATENT OFFICE

FRITZ STRAUB AND WALTER ANDERAU, OF BASEL, SWITZERLAND, ASSIGNORS TO THE FIRM SOCIETY OF CHEMICAL INDUSTRY IN BASLE, OF BASEL, SWITZERLAND

DYESTUFFS CONTAINING METALS AND PROCESS OF MAKING SAME

No Drawing. Application filed July 5, 1929, Serial No. 376,276, and in Switzerland July 13, 1928.

This invention relates to the manufacture of new dyestuffs containing metals. It comprises the process of making these dyestuffs, the dyestuffs themselves, and the material that has been dyed with the new products.

The invention is based on the observation that remarkably fast dyeing products are obtained by treating azo-dyestuffs of the general formula

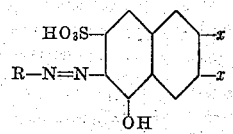

wherein one of the $x$'s stands for hydrogen and the other $x$ for an $NH_2$-group, and wherein R means an aromatic residue which carries a group capable of forming lakes, in any desired sequence with oxidizing agents and with agents yielding metals. This new process may be applied equally well to monoazo-dyestuffs and to polyazo-dyestuffs, irrespective of the number of atomic grouping capable of forming lakes. As groups capable of forming lakes there come into consideration hydroxyl and carboxyl groups which stand in ortho-position to the $-N=N-$ bridge, as well as the ortho-hydroxyl-carboxyl group. The compounds of various metals which may form complexes may be used as agents yielding metals, such as compounds of copper, chromium, nickel, cobalt, titanium, iron, tin, aluminium, or the like, and the complexes may contain one or more metals. As to the oxidizing agent, this also may vary greatly; among others, there have proved particularly useful chlorine (for instance, in the form of hypochlorite), atmospheric oxygen, chromic acid and its salts, hydrogen peroxide and compounds thereof, potassium ferricyanide, or the like, as well as the electrolytic oxidation.

The process may be conducted in any desired sequence. The sodium salts of the color acids may be treated with oxidizing agents and the oxidized dyestuffs then metallized, or else the complex metal compounds may be oxidized. As a whole the properties of the products obtained according to these two methods are identical, but according to the conditions under which the oxidizing agent acts, small differences may be observed.

Particularly valuable have proved to be the products which are derived from diazotized ortho-hydroxy-amino-compounds of the benzene and naphthalene series, such as diazotized chloroaminophenols and nitroaminophenols and the sulfonic acids thereof, diazotized aminonaphthol sulfonic acids, etc., and the 2 - amino - 5 - hydroxynaphthalene-7-sulfonic acid as coupling component.

The new dyestuffs may be made not only in substance but in the dye-bath or on the fiber or in a printing operation.

The following examples illustrate the invention, the parts being by weight:—

Example 1

In a solution alkaline with sodium carbonate, the diazo compound from 223.5 parts of 4-chloro-2-amino-1-phenol-6-sulfonic acid are coupled with 239 parts of 2-amino-5-hydroxynaphthalene-7-sulfonic acid. When coupling is completed, the whole is warmed and there is added an ammoniacal copper oxide solution made from 250 parts of crystallized copper sulfate, whereupon the blue-red color of the copper compound is formed. By evaporation and prolonged drying of the dyestuff there is obtained a new dyestuff which dyes cotton and artificial silk fast grey tints in a bath which is neutral or alkaline with sodium carbonate or caustic alkali. The dyestuff may be purified by re-precipitation. By addition of glycerine or the like or of an oxygen carrier the process of the formation of the dyestuff may be favored.

Example 2

The copper compound of the azo-dyestuff from 4-cholor-2-amino-1-phenol-6-sulfonic acid and 2-amino-5-hydroxy-naphthalene-7-sulfonic acid is dissolved by addition of ammonia to form a hot solution of 6 per cent. strength. Through this solution a current of air is passed for some time, whereby the original compound which dyes red-violet is converted into one which dyes grey. By increasing the temperature and by adding an oxygen carrier, such as a copper salt or a vanadium compound, the process may be accelerated. The product is worked up in the usual manner.

The oxidation with air may also be effected at the boiling temperature without the addition of catalysts.

The oxidation of the metal compounds of the azo-dyestuffs may occur under pressure at a temperature above 100° C.

Example 3

47.4 parts of the azo-dyestuff from 4-chloro-2-amino-1-phenol-6-sulfonic acid and 2-amino-5-hydroxynaphthalene-7-sulfonic acid are converted into the copper compound in known manner and the latter is dissolved in 1200 parts of hot water by addition of 5–7 parts of caustic soda solution. By adding 100–120 parts of potassium ferricyanide there is produced, after some time, from the red-violet parent dyestuff the new dyestuff which dyes fast grey tints and may be separated in the usual manner by salting out.

Instead of potassium ferricyanide there may be used with like result a corresponding proportion of an alkali perborate, alkali persulfate or lead peroxide.

Example 4

The quantity of the azo-dyestuff from diazotized nitrated 1-amino-2-naphthol-4-sulfonic acid and 2-amino-5-naphthol-7-sulfonic acid, corresponding with 70 parts of sodium nitrite, is dissolved in 1200 parts of water, and the solution is mixed with one of chromium fluoride corresponding with 150 parts of $Cr_2O_3$; by boiling the whole in a reflux apparatus for 15–20 hours, the chromium compound which dyes green is produced. The whole is made alkaline with sodium carbonate and filtered from the mud of chromium compound and then mixed with potassium hypochlorite, corresponding with 100–200 parts of active chlorine to produce the new compound. By concentration and salting out, there is obtained a blackish powder which dyes silk and wool fast green tints in an acid bath.

Instead of metal compounds which contain only one metal, there may be used metal compounds of azo-dyestuffs which contain several metals.

Example 5

47.4 parts of the azo-dystuff from 4-chloro-2-amino-1-phenol-6-sulfonic acid and 2-amino-5-hydroxynaphthalene-7-sulfonic acid are dissolved in 1000 parts of water and converted into a zinc compound by addition of a solution of sodium zincate made from 28.7 parts of crystallized zinc sulfate and 20 parts of caustic soda solution of 36° Bé. On addition of 105 or more parts of active chlorine in the form of alkali hypochlorite, the color of the alkali solution changes from blue-red towards black violet. The zinc compound can be isolated as usual by neutralizing and adding common salt.

Example 6

The quantity of the ortho-oxyazo-dyestuff from diazotized 2-amino-1-phenol-4:6-disulfonic acid and 2-amino-5-hydroxynaphthalene-7-sulfonic acid, which corresponds with 7 parts of sodium nitrite, is converted in known manner into the copper compound and this is dissolved in 1000 parts of water and made acid by means of 18 parts of acetic acid. There are now added, by degrees, at a slightly raised temperature 8–15 parts of potassium bichromate and the whole is stirred for some time. The color passes from violet to grey. By evaporation and salting out the new dyestuff is obtained; it dyes silk and wool in an acid bath containing Glauber's salt fast grey tints.

Example 7

213 parts of 4-nitro-2-amino-1-phenol-6-sulfonic acid are diazotized and coupled in presence of sodium carbonate with 239 parts of 2-amino-5-hydroxynaphthalene7-sulfonic acid. When coupling is complete, the whole is diluted with water to 4 times its volume and oxidized with 150 or more parts of active chlorine in the form of an alkali hypochlorite accompanied by slight heating. The dyestuff is dark brown-violet in alkaline solution and brown-orange in acetic acid solution; in concentrated sulfuric acid it dissolves to a blackish solution. It dyes cotton in a bath alkaline with sodium carbonate grey tints, which become a grey fast to acids and light by an after-treatment with a copper salt. The solution is then acidified slightly with acetic acid and by addition of 250 parts of copper sulfate in the form of a concentrated solution, the dyestuff is converted into the copper compound. From the heated solution the latter is precipitated by adding common salt and purified by recrystallization. There is thus obtained a blackish powder which dissolves in water and dilute alkalies to a grey solution and in concentrated sulfuric acid to a greenish-blue solution; it dyes fiber fast greenish-grey tints.

Example 8

From the violet copper compounds of the dyestuffs indicated by the following schemes, fast grey tints can be developed in the dye-bath in presence of an oxidizing agent:

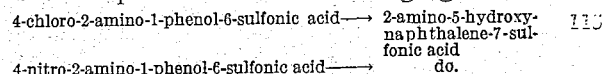

For 10 parts of cotton there is prepared a dye-bath from 400 parts of water, 0.3 part of copper compound and 0.3–1 part of potassium ferricyanide or the like quantity of hydrogen peroxide solution of 25 per cent. strength, and 0.5 part or more of sodium carbonate. The goods are entered at 20–30° C. and the bath is gradually heated to boiling and gently boiled for ¾ to 1 hour. At half time, it is advantageous to add some common salt or Glauber's salt amounting to 1–2 parts. The goods are then rinsed hot and lightly soaped. Reddish-grey to greenish-grey tints are obtained having excellent properties of fastness.

Example 9

The metal compounds of the azo-dyestuffs serving as parent materials in the foregoing examples can be developed to fast grey tints and fixed by printing them and subsequently steaming in the presence of an oxidizing agent.

For the manufacture of the printing paste, 5 parts of the complex metal compound of 60 per cent. strength is made into a paste with 20 parts of water, and this paste is mixed in the usual manner with 60 parts of starch tragacanth thickening, 5 parts of sodium chlorate of 40 per cent. strength and 10 parts of water. After printing, the goods are steamed for 3/4 hour under 3/4 atmosphere pressure and then soaped.

Instead of sodium chlorate, 5 parts of potassium ferricyanide of 40 per cent. strength or copper acetate may be used, or some other oxidizing agent.

Example 10

100 parts of wool are thoroughly wetted in 2000 parts of water in the usual manner. 2 parts of the dyestuff made as described in Example 4 are dissolved in 10-15 times their weight of boiling water and added to the dye-bath heated to 90° C. After addition of one-third of the necessary proportion of acid and 10 per cent. of Glauber's salt, the goods are entered and the bath brought to the boil and boiled for 20 minutes to half an hour. A second third part of the acid is then added and the boiling continued for 20-30 minutes, whereupon the remainder of the acid is added and boiling again continued for 1/2 hour.

In all, 9 parts of sulfuric acid are necessary.

After dyeing, the goods are thoroughly rinsed.

Example 11

100 parts of silk are thoroughly wetted in 2000 parts of water in the usual manner. There are then added to the dye-bath, heated to 60° C., 4 per cent. of acetic acid of 40 per cent. strength, 2 parts of the dyestuff made as described in Example 2 dissolved in 10-15 times its weight of hot water; the goods are entered and dyeing is continued for 1/4 of an hour at 60° C. after which the temperature is raised to 80-85° C. and a further 2-4 per cent. of acetic acid of 40 per cent. strength is added, and dyeing is continued for one-half to three-quarters of an hour at the last-named temperature. The goods are then rinsed and dried.

Example 12

100 parts of well boiled out or thoroughly wetted cotton are dyed in a dye-bath containing 2500 parts of water, to which have been added 2 parts of the dyestuff made as prescribed in Example 6, dissolved in 10-15 times their weight of hot water. The goods are entered at 20-25° C. and the temperature of the bath is raised to boiling in the course of 1/2-3/4 hour; there are then added to the dye-bath 25-30 parts of Glauber's salt and the goods are handled at the boiling temperature for 10-15 minutes, whereupon the dye-bath is cooled to 85° C. and handling continued at this temperature for another half-hour. The goods are then washed and dried. It is also possible to dye in a feebly alkaline or feebly acid bath.

In the following table are given further examples of metalliferous dyestuffs which can be converted into individual products by treatment with hypochlorite:

| | Metal | Diazotizing component | Coupling component | Tint of the dyeing of the parent product | Tint of the dyeing of the oxidized dyestuff |
|---|---|---|---|---|---|
| 1. | Cu | 4-chloro-2-amino-1-phenol-6-sulfonic acid | 2-amino-5-hydroxynaphthalene-7-sulfonic acid. | Blue-red | Blue-grey. |
| 2. | Ni | do | do | do | Grey. |
| 3. | Cu | Sulfo-amido-salicylic acid | do | do | Do. |
| 4. | Cu | 2-amino-1-phenol-4-sulfonic acid | do | do | Reddish-grey. |
| 5. | Cu | 4-nitro-2-amino-1-phenol | do | Red-violet | Red-grey. |
| 6. | Cu | 4-nitro-2-amino-1-phenol-6-sulfonic acid | do | do | Green-grey. |
| 7. | Cu | Nitrated 1-diazo-2-hydroxynaphthalene-4-sulfonic acid. | do | Violet | Blue-green. |
| 8. | Cu | 2-diazo-1-hydroxynaphthalene-4: 8-disulfonic acid. | do | do | Blue. |
| 9. | Cu | 4-chloro-2-amino-1-phenol-6-sulfonic acid | 2-amino-8-hydroxynaphthalene-6-sulfonic acid. | do | Grey. |
| 10. | Cu | Anthranilic acid | 2-amino-5-hydroxynaphthalene-7-sulfonic acid. | do | Brown-grey. |
| 11. | Cr | 5-nitro-2-amino-1-phenol | do | Blue | Blue-green. |
| 12. | Cu & Cr | 4-chloro-2-amino-1-phenol-6-sulfonic acid | do | Blue-violet | Grey-blue. |
| 13. | Cr | Sulfo-amido-salicylic acid | do | Violet | Red-grey. |
| 14. | Cr | 2-amino-1-phenol-4-sulfonic acid | do | do | Blue-grey. |
| 15. | Cr | 4-nitro-2-amino-1-phenol-6-sulfonic acid | do | Blue-violet | Green-blue. |
| 16. | Cr | 2-amino-1-hydroxynaphthalene-4: 8-disulfonic acid. | do | Blue | Do. |
| 17. | Cu | Azo-dyestuff from 4-chloro-2-amino-1-phenol-6-sulfonic acid→2-amino-5-hydroxynaphthalene-7-sulfonic acid (alkaline). | do | do | Grey. |
| 18. | Cu | 5-nitro-2-amino-1-phenol | 2-amino-5-hydroxynaphthalene-1: 7-disulfonic acid. | do | Blue-grey. |

What we claim is:—

1. Process for the manufacture of new dyestuffs containing metals, consisting in treating azo-dyestuffs of the general formula

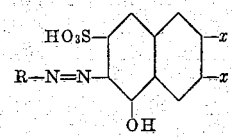

wherein one of the $x$'s stands for hydrogen and the other $x$ for an $NH_2$-group, and wherein R means an aromatic radicle of any diazo-compound which carries a group capable of forming lakes, in any desired sequence with oxidizing agents and with agents yielding metals which are capable of forming complexes.

2. Process for the manufacture of new dyestuffs containing metals, consisting in treating azo-dyestuffs of the general formula

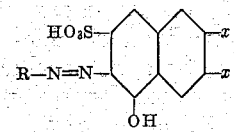

wherein one of the $x$'s stands for hydrogen and the other $x$ for an $NH_2$-group, and wherein R means an aromatic radicle of any diazo compound which carries in ortho-position to the —N=N— bridge a group capable of forming lakes, in any desired sequence with oxidizing agents and with agents yielding metals of the atomic weight ranging between 48.1 and 65.4 which are capable of forming complexes.

3. Process for the manufacture of new dyestuffs containing metals, consisting in treating azo-dyestuffs of the general formula

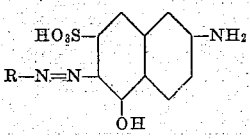

wherein R stands for an aromatic radicle of any diazo-compound which carries in ortho-position to the —N=N— group a group capable of forming lakes, in any desired sequence with oxidizing agents and with agents yielding metals of the atomic weight ranging between 52.1 and 63.6 which are capable of forming complexes.

4. Process for the manufacture of new dyestuffs containing metals, consisting in treating azo-dyestuffs of the general formula

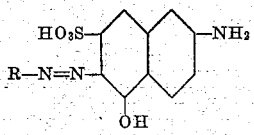

wherein R stands for an aromatic radicle of any diazo-compound which carries in ortho-position to the —N=N— group a hydroxyl group, in any desired sequence with oxidizing agents and with agents yielding metals of the atomic weight ranging between 52.1 and 63.6 which are capable of forming complexes.

5. Process for the manufacture of new dyestuffs containing metals, consisting in treating azo-dyestuffs of the general formula

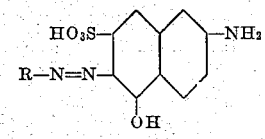

wherein R stands for a radicle of the phenyl series which carries in ortho-position to the —N=N— group a hydroxyl group, with agents yielding copper and with oxidizing agents.

6. Process for the manufacture of a new dyesuff containing copper, consisting in treating an azo-dyestuff of the formula

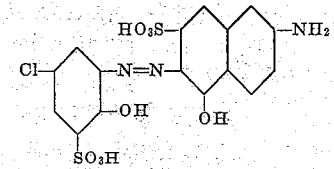

with agents yielding copper and with sodium hypochlorite.

7. As new products the dyestuffs containing metals which are obtained by treating azo-dyestuffs of the general formula

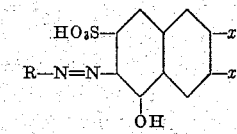

wherein one of the $x$'s stands for hydrogen and the other $x$ for an $NH_2$-group, and wherein R means an aromatic radicle of any diazo-compound which carries a group capable of forming lakes, in any desired sequence with oxidizing agents and with agents yielding metals which are capable of forming complexes, which products form dark powders which dye cotton and artificial silks fast green-grey to red-grey, blue-green, brown-grey and grey tints.

8. As new products the dyestuffs containing metals which are obtained by treating azo-dyestuffs of the general formula

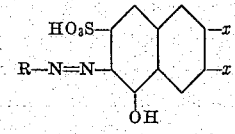

wherein one of the $x$'s stands for hydrogen and the other $x$ for a $NH_2$-group, and wherein R means an aromatic radicle of any diazo compound which carries in ortho-position to the —N=N— bridge a group capable of forming lakes, in any desired sequence with oxidizing agents and with agents yielding metals of the atomic weight ranging between 48.1 and 65.4 which are capable of forming complexes, which products form dark powders which dye cotton and artificial silks fast green-grey to red-grey, blue-green, brown-grey and grey tints.

9. As new products the dyestuffs containing metals which are obtained by treating azo-dyestuffs of the general formula

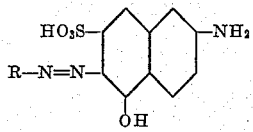

wherein R stands for an aromatic radicle of any diazo-compound which carries in ortho-position to the —N=N— group a group capable of forming lakes, in any desired sequence with oxidizing agents and with agents yielding metals of the atomic weight ranging between 52.1 and 63.6 which are capable of forming complexes, which products form dark powders which dye cotton and artificial silks fast green-grey to red-grey, blue-green, brown-grey and grey tints.

10. As new products the dyestuffs containing metals which are obtained by treating azo-dyestuffs of the general formula

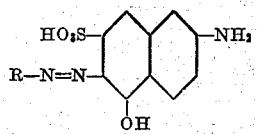

wherein R stands for an aromatic radicle of any diazo-compound which carries in ortho-position to the —N=N— group a hydroxyl group, in any desired sequence with oxidizing agents and with agents yielding metals of the atomic weight ranging between 52.1 and 63.6 which are capable of forming complexes, which products form dark powders which dye cotton and artificial silks fast green-grey to red-grey, blue-green and grey tints.

11. As new products the dyestuffs containing metals which are obtained by treating azo-dyestuffs of the general formula

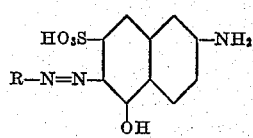

wherein R stands for a radicle of the phenyl series which carries in ortho-position to the —N=N— group a hydroxyl group, with agents yielding copper and with oxidizing agents, which products form dark powders which dye cotton and artificial silks fast green-grey to red-grey, blue-green and grey tints.

12. As a new product the dyestuff containing copper which is obtained by treating the azo-dyestuff of the formula

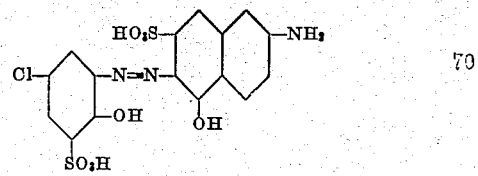

with agents yielding copper and with sodium hypochlorite, which product forms a dark powder which dyes cotton and artificial silks fast grey tints.

In witness whereof we have hereunto signed our names this 24th day of June, 1929.

FRITZ STRAUB.
WALTER ANDERAU.